United States Patent [19]

Simmons

[11] 3,925,139
[45] Dec. 9, 1975

[54] SEAL MONITORING APPARATUS

[75] Inventor: Charles J. Simmons, East Longmeadow, Mass.

[73] Assignee: Package Machinery Company, East Longmeadow, Mass.

[22] Filed: Jan. 10, 1974

[21] Appl. No.: 432,321

[52] U.S. Cl. .................. 156/358; 53/53; 53/78; 156/378; 219/243; 219/494; 219/497; 219/501; 340/213 Q
[51] Int. Cl.² .................................. G05G 15/00
[58] Field of Search ............ 156/351, 358, 359, 366, 156/378, 64; 219/243, 248, 251, 497, 499, 501; 340/213 Q, 411, 412, 417, 227, 228, 213 U; 53/53, 78; 425/143, 144

[56] References Cited
UNITED STATES PATENTS

| | | | |
|---|---|---|---|
| 3,095,492 | 6/1963 | Gaiennie | 219/243 |
| 3,359,702 | 12/1967 | Beeut et al. | 53/53 |
| 3,473,288 | 10/1969 | Nakamura et al. | 53/182 X |
| 3,494,816 | 2/1970 | Fener | 156/359 |
| 3,569,949 | 3/1971 | Isaacs | 340/213 R |
| 3,575,766 | 10/1971 | McArthur et al. | 156/583 X |
| 3,632,986 | 1/1972 | Neer | 219/499 X |
| 3,699,305 | 10/1972 | Reenstra | 219/243 X |
| 3,700,933 | 10/1972 | Harkenrider | 219/499 X |
| 3,721,801 | 3/1973 | Bate | 53/182 X |
| 3,750,134 | 7/1973 | Weisend | 340/213 Q X |

*Primary Examiner*—Douglas J. Drummond
*Assistant Examiner*—David A. Simmons
*Attorney, Agent, or Firm*—McCormick, Paulding & Huber

[57] ABSTRACT

Seal monitoring apparatus is employed in a packaging machine as a quality control device insuring that heat seals formed in a film wrapper or casing are adequately secure. The apparatus includes a sensor or sensors which monitor important parameters controlling the formation of the seal, and a comparator which determines whether the sensed parameters fall within a predefined tolerance. If the parameter exceeds the tolerance, an alarm is sounded or a reject device is actuated to remove the malformed wrappers. Parameters which are sensed include the temperature to which the seal is heated during its formation, the pressure with which the seal is formed and the electrical energy dissipated during the formation of the heat seal.

15 Claims, 7 Drawing Figures

SEAL MONITORING APPARATUS

BACKGROUND OF THE INVENTION

The present invention relates to apparatus for monitoring the formation of seals in a packaging operation. More particularly, the invention relates to the monitoring of selected parameters which are indicative of the quality of a heat seal formed in a fusible packaging material.

The formation of high quality seals in a film package is important for several reasons. Firstly, a good seal prevents any of the packaged material from leaking or falling out of the package before it reaches the ultimate user and before it is actually ready for use. For example, it is currently possible to find liquid, such as milk or sauces, and dry goods, such as candy and flour, packaged as bulk items within transparent film pouches. The ovbious consequences of a pouch having a faulty seal are leaking and an unsanitary mess which indicate rather clearly that there is little tolerance for faulty seals, particulary in packages containing consumer items such as food stuffs and other products.

Another reason for insuring good seals in film wrappers is that the wrapper is sometimes utilized as a protective cover and prevents elements outside of the package from reaching the material within. Defective seals depreciate the quality of the protection offered by the wrapper by admitting unwanted elements which may partially or completely destroy the sanitary or other desired atmosphere within the package.

Although the importance of a good seal is readily appreciated, seal monitoring apparatus has not previously been employed on packaging machines within the knowledge of the present inventor. It is, accordingly, a general object of the present invention to disclose apparatus for monitoring the formation of seals in a packaging machine while the packaging operation is being carried out.

SUMMARY OF THE INVENTION

The present invention resides in a seal monitoring apparatus employed in a packaging machine which forms a heat seal by heating and pressing multiple plies of a fusible material between heat sealing members.

The apparatus includes sensing means connected with and cooperative with the sealing members to generate signals representative of a selected sealing parameter during operation of the sealing members. In one embodiment of the invention, such a parameter includes the temperature to which the fusible materials are elevated during the sealing operation. In additional embodiments of the invention, other monitored parameters may include the pressure with which the plies of the material are pressed together or the energy expended in heating the materials to the fusing temperature. Also, one or more parameters may be monitored simultaneously with others in a single monitoring system.

The apparatus further includes comparator means connected with the sensing means for receiving the signal generated by the sensor and comparing the generated signal with a preselected reference value. The comparator means may include dual comparators which establish a preselected tolerance, that is, upper and lower limits, within which the sensed parameter should fall if a seal is properly formed. If the monitored parameter or parameters are out of tolerance or exceed the reference values, the comparator produces a signal.

An alarm or reject device is connected with the comparator means and responds to the signal from the comparator means indicating that the seal parameter is out of tolerance either by producing an alarm signal or by rejecting the malformed packages. The sensor signals can also be used to control components which regulate the seal parameters.

DESCRIPTION OF THE PREFERRED EMBODIMENTS

Figures 1, 2, 3:
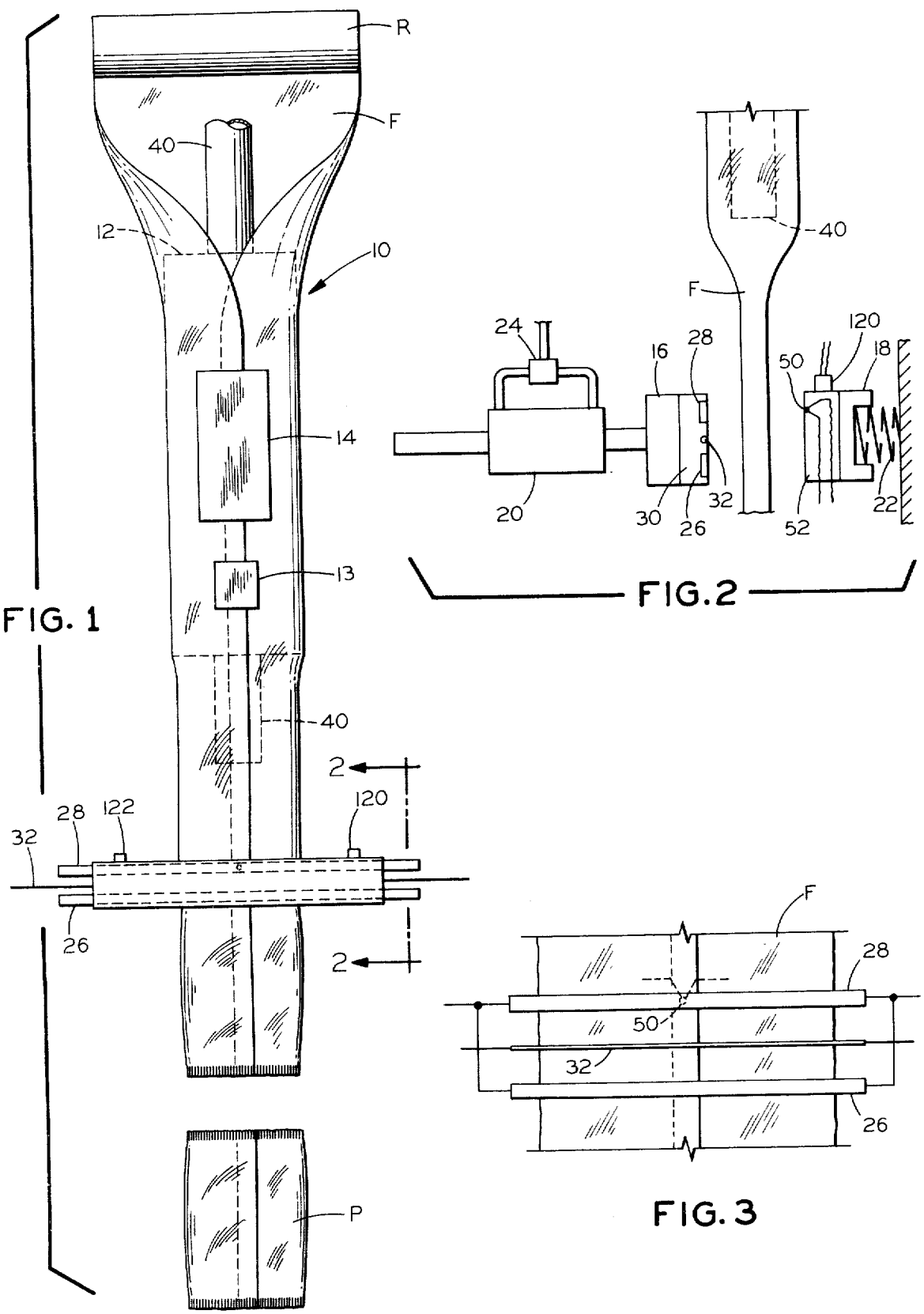
FIG. 1 illustrates schematically a form, fill and seal packaging machine which discharges in a repetitive operation sealed pouches filled with bulk material.
FIG. 2 is a cross sectional view of the packaging machine in FIG. 1 in the vicinity of the sealing jaws and as viewed along the sectioning line 2—2 in FIG. 1.
FIG. 3 is a fragmentary view of the formed film in the vicinity of the sealing jaws and illustrates the positioning of a temperature sensor relative to the film and the heating elements of the sealing jaws.

FIG. 1 illustrates schematically a packaging machine, generally designated 10, of the type sometimes referred to as a form, fill and seal machine. Such machines are known in the art and a representative machine of this type is marketed under the trade name PATRIOT by the assignee of the present invention.

The packaging machine 10 receives a bulk material, forms a pouch from a fusible film material, fills the pouch with the bulk material, then seals the pouch and discharges it from the machine. Such a machine is capable of packaging liquid or semi-liquid materials such as water, milk, juice, oil, sauces and the like. The same general type of machine is also capable of packaging dry goods, prepared food stuffs or food ingredients, grass seed, fertilizer and similar products.

Regardless of the type of bulk material being packaged by the machine, the general packaging operation is as follows. A film of fusible material such as polyethylene, polypropylene, polyfoil-paper laminations and other materials is pulled in a single sheet from a feed roll onto a tube or sleeve former 12 by an indexing feed mechanism 13. On the former 12 the longitudinal edges of the film F are folded in overlapping relationship to produce a long sleeve of the material. The former 12 and the film F are sized so that the longitudinal edges of the film overlap by a limited amount when the film completely circumscribes the former 12. The overlapping edges then are pulled under a "long-seal" heater 14 which presses the overlapped edges against the former and at the same time heats the edges to generate a continuous long seal extending longitudinally along the sleeve of film.

After the film has passed over the former 12, it is indexed between a pair of sealing and cut-off jaws 16 and 18 shown most clearly in FIG. 2. In one form of the invention, the sealing jaw 16 is mounted on a pneumatic cylinder 20 for reciprocation relative to the stationary sealing jaw 18 resiliently supported from the frame of the machine by a set of springs 22 and associated guide members (not shown). The pneumatic cylinder 20 is periodically actuated by a valve 24 and causes the clamping surface of the movable jaw 16 to clamp the sleeve of film F against the clamping surface of the stationary jaw 18 with a predetermined pressure level established principally by the springs 22. A pair of heating ribbons 26 and 28 are imbedded in the head 30 of the movable jaw 16 at the clamping surface and are turned on while the film F is clamped against the stationary jaw to fuse the double plies of the formed sleeve together and to form two separate and parallel heat seals extending transversely across the sleeve.

During each clamping operation, the lower heating ribbon 26 forms the top or closing seal of a pouch which is about to be discharged from the machine while the upper heating ribbon 28 forms the bottom seal of the pouch to be discharged in the subsequent cycle of operation. The lower end of the sleeve, therefore, is closed by a heat seal whenever the jaws 16 and 18 are open.

A heated cut-off wire 32 is interposed between the two heating ribbons and extends parallel to the ribbons across the head 30 to sever the sleeve along a line intermediate to the heat seals formed by the ribbons 26 and 28. As a result, a completely sealed pouch P illustrated in FIG. 1 drops away from the formed sleeve each time the sealing jaws 16 and 18 open.

To perform a filling operation in conjunction with the forming and sealing operation, a fill tube 40 extends from a feed bin or vat (not shown) above the former 12 through the former to a station below the former and above the sealing jaws as illustrated in FIG. 1. Bulk material to be enclosed within the sealed pouches P is discharged in measured quantities from the fill tube into the sealed end of the film sleeve adjacent the sealing jaws 16 and 18. During this same period the film F is advanced by the feed mechanism 13 over the former 12 so that the sealed end of the sleeve drops between the jaws 16 and 18. In the subsequent steps of operation, the jaws close upon the sleeve, generate the two heat seals, one of which closes the pouch, and cut the closed pouch from the rest of the sleeve. From the above, it will be readily understood that the packaging machine 10 forms, fills and seals the pouches P which are then discharged from the machine.

In accordance with the present invention, the parameters which determine the quality of the heat seal formed by the jaws 16 and 18 are monitored during each sealing operation. Such parameters may include the temperature to which the film F is heated by the ribbons 26 and 28 in the movable jaw 16, the pressure with which the jaws 16 and 18 press the plies of the film together and the electrical energy dissipated in heating the film to cause the plies to fuse together.

Testing has indicated that one of the more significant parameters to be monitored is the temperature to which the fusible film material is heated by the ribbons 26 and 28. To this end a thermocouple 50 is imbedded in the head 52 of the stationary jaw 18 at a station on the clamping surface directly opposite the heating ribbon 28 in the movable jaw 16. The head 52 as well as the head 30 of the jaw 16 are constructed of a material having a low heat capacity such as a phenolic or phenolic impregnated fiber glass which also insulates the remainder of the jaws 16 and 18 from the heat dissipated by the ribbons 26 and 28. The thermocouple 50, therefore, primarily senses the temperature to which the film is elevated during the sealing operation.

It will be observed in FIG. 3 that the heating ribbons 26 and 28 are electrically connected in parallel so that the operation or non-operation of one of the ribbons will have some effect upon the other. A more pronounced effect of one ribbon upon the other could be obtained by connecting the ribbons in series. In either case, the thermocouple 50, although associated with only one of the heating ribbons, in fact provides some indication of how the other ribbon is operating and hence, permits both of the heat seals formed to be monitored. Of course, if desired, it is contemplated within the scope of the present invention that separate thermocouples associated with the respective heating ribbons can be employed.

The monitoring function performed by the thermocouple 50 as illustrated in FIG. 3 also extends to the long seal formed by the heater 14 in conjunction with the former 12. Residual heat retained in the long seal as the film passes from the former 12 to the sealing jaws 16 and 18 is detected by the thermocouple 50 provided that it is positioned at the intersection of the long seal and the lateral seal formed by the heating ribbon 28. It has been found by experiment that the sensitivity of the thermocouple in the illustrated position is adequate to detect malfunctions of either the heater 14 or the ribbon 28.

Figure 4:
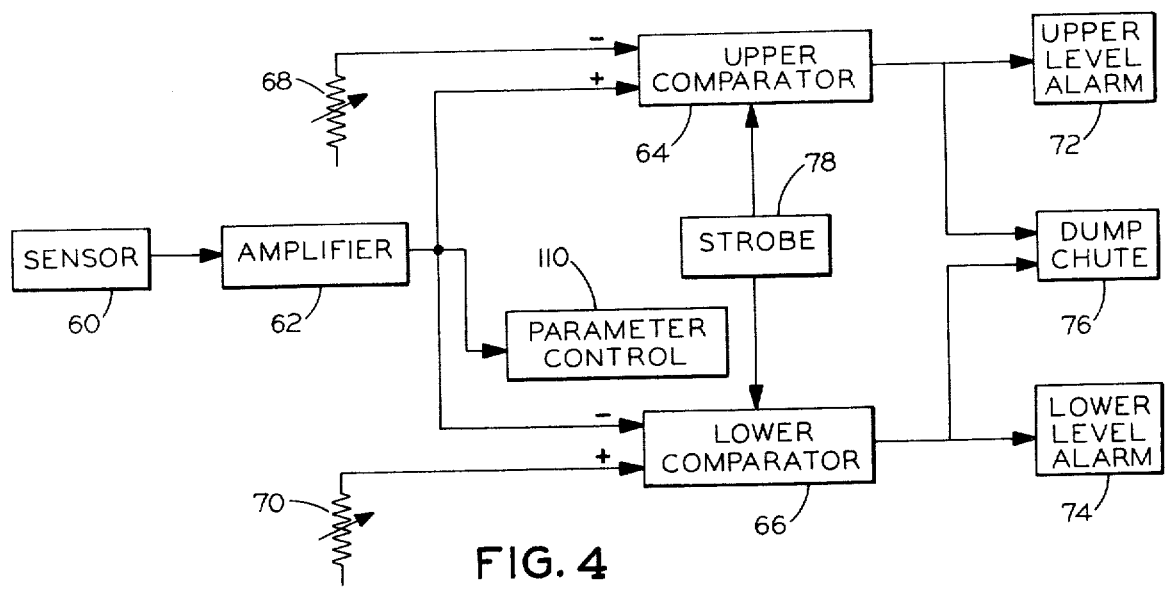
FIG. 4 is a schematic diagram of the monitoring apparatus of the present invention.

Once the temperature of the seal or seals is sensed, the signal produced by the thermocouple 50 is processed in a manner such as that indicated in the schematic of the monitoring apparatus in FIG. 4. The thermocouple 50 or some other sensor generally designated 60 is connected to an amplifier 62 which may convert the signal and possibly shape the signal for subsequent use. As illustrated, the output of the amplifier 62 is connected to both an upper comparator 64 and a lower comparator 66. Both comparators are conventional differential comparators and produce an output whenever the input signal from amplifier 62 exceeds a preselected reference value. The reference value which actuates the comparator 64 is set by a potentiometer 68 connected to a negative input of the comparator while the sensor signal is applied to the positive input. The reference value which actuates the comparator 66 is set by a potentiometer 70 connected to the position input of the comparator while the sensor signal is applied to the negative input. With the dual comparator apparatus illustrated, it is possible to establish both upper and lower limits within which the sensed parameter must fall to achieve proper seal formation. The potentiometers 68 and 70 are effectively memory devices in which the upper and lower limits are stored. Of course, it is possible to use only a single comparator if the parameter being monitor has only one critical level below or above which the parameter should remain. However, the seal temperature detected by the thermocouple 50 has both an upper and lower limit which should not be exceeded if the seal is to be properly formed. If the temperature exceeds an upper limit, the film material may be burned and weakened which would allow the pouch to easily rupture. On the other hand, if the temperature falls below or exceeds a lower limit, a weak or non-existant seal may result due to insufficient heating and fusion of the material. From the foregoing it is apparent that the term exceeds is used in the broad sense and means that a parameter falls outside a given tolerance, that is, either above an upper limit or below a lower limit.

As stated above, for parameters which have both upper and lower limits, the potentiometer 68 is set to trigger the comparator 64 at the upper limit and the potentiometer 70 is set to trigger the comparator 66 at the lower limit. The upper comparator 64 is connected to the upper level alarm device 72 which may be either an audio or visual alarm device that would be detected by operators of the packaging machine 10. In a similar manner, the lower comparator 66 is connected to a lower level alarm device 64. If it is not necessary to discriminate between situations in which the temperature exceeds either the upper limit or lower limit, a single alarm device may be sufficient.

FIG. 4 indicates that the comparators 64 and 66 may actuate a reject device 76, such as a dump chute, which diverts any malformed pouches away from a conveyor or other take-out device into which the pouches that are properly formed are deposited. Since the heating ribbons 26 and 28 operate simultaneously on two pouches, a latch circuit is provided to hold the chute in the reject position for one additional sealing cycle after the out-of-tolerance signal disappears and the alarm shuts off to be certain that both or all malformed pouches are diverted. In this manner, automatic separation of the malformed pouches from the others is triggered and controlled by the sensor 60 without the intervention of human operators.

FIG. 4 also illustrates a strobe or timing circuit 78 which triggers the upper comparator 64 and lower comparator 66 at a specific time during a sealing operation when the proper seal temperature should be reached. It will be understood that the sealing jaws 16 and 18 in FIG. 2 are not always in contact with the sleeve of film material being sealed. For example, the jaws are open and out of contact with the film as the film is indexed along the sleeve former 12 and the lower end of the sleeve drops between the jaws by an amount equal to the length of a pouch. During such interval, the heating ribbons 26 and 28 are also out of contact with the film and are preferably turned off so that they do not overheat. When the jaws 16 and 18 again clamp the sleeve of film material, the heating ribbons are turned on by a switch sensing the closing of the jaws, and heating of the film along the lateral seal sensed by the thermocouple 50 is initiated. To obtain a meaningful temperature reading for the comparators, therefore, it is necessary to wait until a time near the end of the sealing operation when the ply of film adjacent to the thermocouple has fused to the adjacent ply confronting the heating ribbon 28.

Accordingly, the strobe circuit 78 produces a timing signal a preselected interval after the jaws 16 and 18 have closed. The comparators 64 and 66 receive the signal from the strobe circuit and are gated on by the signal. In this manner a comparison is made between a sensed temperature and the preselected limits established by the potentiometers 68 and 70 during the period of the sealing operation when the seal temperature is most meaningful.

Figure 5:
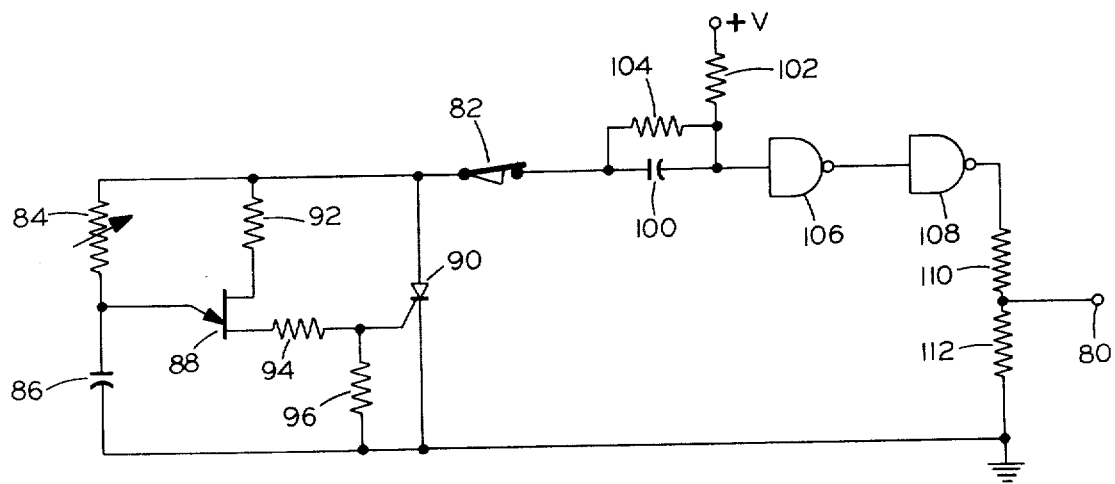
FIG. 5 is an electrical diagram of a strobe or timing circuit utilized to trigger the comparators in FIG. 4.

An exemplary strobing circuit is shown in greater detail in FIG. 5. The circuit effectively generates a pulse at an output terminal 80 a preselected interval after the clamping jaws 16 and 18 have closed. To initiate the strobing operation, a mechanical switch 82 is closed when the sealing jaws 16 and 18 are closed. The switch 82 may be operated directly by the jaws or by a control cam within the packaging machine 10 which causes the pneumatic cylinder 20 to close the jaws. A delay circuit comprised of a resistor 84 and a charging capacitor 86 is energized through the switch 82 and when the capacitor 86 has acquired a preselected charge a predetermined interval after the switch 82 closes, it triggers the unijunction transistor 88 into conduction and sends a current pulse through the control gate of the silicon controlled rectifier (SCR) 90. The variable resistor 84 permits the charging current and, accordingly, the delay interval to be adjusted. The resistors 92, 94 and 96 are bias resistors for triggering the SCR 90.

During the delay a capacitor 100 is also charged through a resistor 102 connected to the power supply. The resistor 104 is relatively small and hence, does not readily effect the charging of capacitor 86 during the delay period. When the SCR 90 is triggered, the one plate of capacitor 100 connecting with switch 82 drops almost to ground and causes the voltage level at the opposite plate to drop in a stepwise manner by a corresponding amount. Accordingly, the input of the integrated pulse-shaping circuit 106 experiences a sudden drop in voltage and a sharply formed pulse is generated at its output. Further shaping and inversion of the pulse is produced by the integrated circuit 108. The output resistors 110 and 112 accordingly receive a sharp pulse which becomes the timing signal at terminal 80 that triggers the comparators 64 and 66 in FIG. 4.

FIG. 4 illustrates further that the sensor 60 can be used as part of a closed loop system for controlling the parameter being sensed. The output of the amplifier 62, for example, is directed to a parameter control 110 which determines whether the sensed parameter coincides with a preselected value for the parameter and if it does not then suitable adjustments of the parameter control are made to bring the parameter into correspondence with the preselected value. In the case of the seal temperature detected by the thermocouple 50, the parameter control might regulate the electrical power supplied to the heating ribbons 26 and 28. Regulation of electrical power applied by an ac excitation current is conveniently made by either reducing the amplitude of the current or by phase controlling the current. Phase controlled power which is well known in the art is derived from ac current by exciting the heating ribbons only during selected portions of each ac power cycle.

FIGS. 1 and 2 also illustrate that parameters other than temperature may be sensed at the sealing jaws 16 and 18. For example, strain gages 120 and 122 can be mounted on the resiliently supported stationary jaw 18 at each end of the jaw as illustrated in FIGS. 1 and 2. The pressure with which the jaws close also has a bearing upon the quality of the seal formed and by maintaining the pressures at opposite ends of the jaws substantially equal to one another and within a preselected tolerance, the resulting seal is more properly formed along its entire length.

Figure 6:
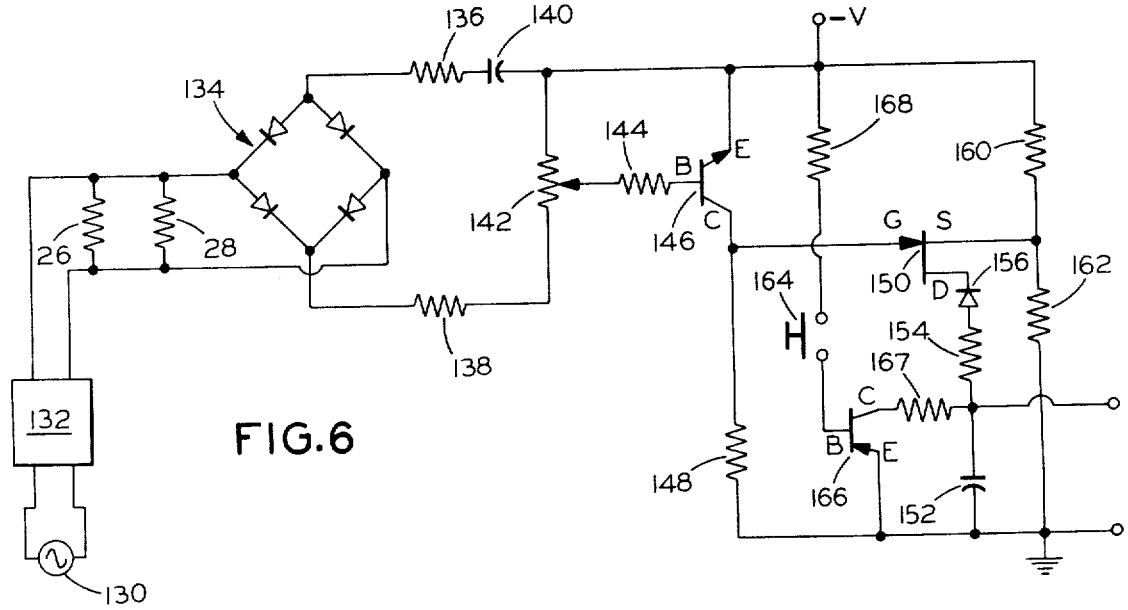
FIG. 6 is an electrical diagram illustrating a circuit for sensing the electrical energy dissipated by the sealing members in the packaging machine shown in FIG. 1.

FIG. 6 illustrates a sampling and hold circuit for sensing the electrical energy applied to the sealing ribbons 26 and 28 during the sealing operation. Like the temperature sensor or thermocouple 50 and the strain gages 120 and 122, the circuit in FIG. 6 can be used as the sole source of information for monitoring the seal or may be used in combination with the other sensors. Within the scope of the present application, the circuit detecting the electrical power is to be considered a sensor.

In FIG. 6 the heating ribbons 26 and 28 are illustrated schematically and are excited by an AC power source 130 through a phased power controller 132 so that limited and controlled portions of each AC cycle excite the ribbons 26 and 28. A full wave, diode rectifier 134 detects and rectifies the AC voltage applied to the heating ribbons and has its output connected through a sampling circuit comprised of two isolation and limiting resistors 136, 138, a filtering and isolation capacitor 140 and a gain controlling potentiometer 142. The voltage level detected at the output of potentiometer 142 is, therefore, effectively representative of the average excitation voltage applied to the heating ribbons during each half of a power cycle. A limiting resistor 144 applies the average voltage to the base of a transistor 146 which together with the load resistor 148 form a trigger circuit for operating an integrating circuit during that interval of time when the average voltage applied to the heating ribbons 26 and 28 holds the transistor 146 turned on. The output of the trigger circuit developed by the load resistor 148 is connected to the gate of a junction-type field effect transistor (FET) 150 in the integrating circuit. The rest of the integrating circuit includes a charging capacitor 152 and a load resistor 154 serially connected through a blocking diode 156 with the drain-to-source path of the transistor 150. The bias resistors 160 and 162 connected to a negative power supply establish the voltage toward which the capacitor 152 charges when the FET 150 is gated on by the transistor 146.

Accordingly, the potentiometer 142 outputs a trigger voltage during each half cycle of AC power energizing the heating ribbons 26 and 28 and causes the capacitor 152 to charge an incremental amount. A succession of AC excitation cycles applied to the ribbons, therefore, incrementally increases the charge on the capacitor 152 which acquires a total charge at the end of a sealing operation proportional to the total electrical energy applied to the ribbons or the total heat energy developed by the ribbons in fusing the film material. It will be observed that the average voltage developed by the potentiometer 142 for charging the capacitor 152 represents the average power delivered to the heating ribbons 26 and 28 regardless of whether the AC power is amplitude-modulated or phase-controlled. Comparing the power delivered to the ribbons with a preselected power is accomplished by the monitoring apparatus illustrated and described above in connection with FIG. 4 so that the sampling and hold circuit of FIG. 6 is simply another sensor 60.

It will be noted that the sampling, triggering and integrating circuits operate as long as power is applied to the heating ribbons 26 and 28. Unless other steps are taken, the capacitor 152 will continue to accumulate and hold a charge until it reaches the voltage established by the bias resistors 160 and 162. Since it is important to measure the electrical energy delivered to a single heat seal, a reset circuit discharges the capacitor 152 after each sealing operation. The reset circuit includes a mechanical switch 164 which is closed by the packaging machine 10 after the heating of ribbons 26 and 28 is terminated by the control 132 and the sealing jaws 16 and 18 have been opened. The remaining components in the reset circuit include a transistor 166 connected by means of a resistor 167 in a discharging path with the capacitor 152. The base of the transistor 166 is connected through a current limiting resistor 168 to the power supply so that upon closing of the switch 164, the transistor 166 is turned on and the accumulated charge on the capacitor 152 drains off through the resistor 167. The capacitor 152 is, therefore, discharged before electrical power is reapplied to the sealing ribbons 26 and 28 in a subsequent sealing operation.

Figure 7:
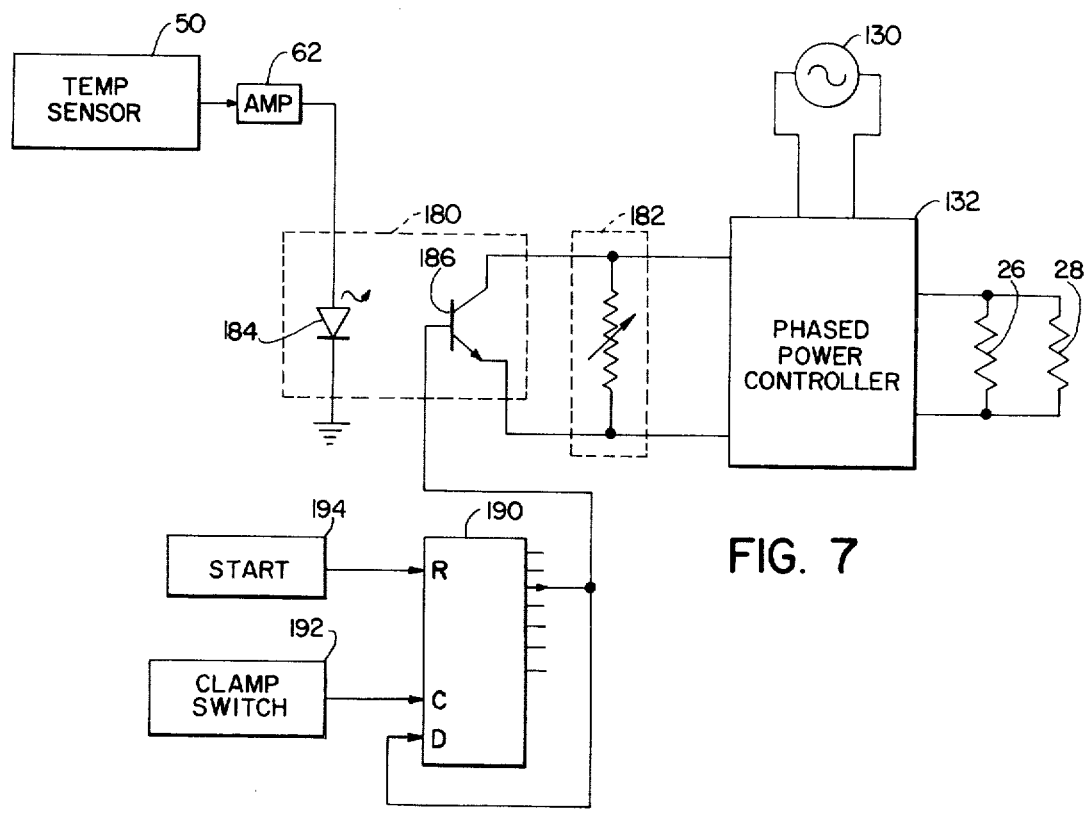
FIG. 7 is a schematic diagram illustrating the monitoring apparatus in a closed control loop providing feedback for controlling the sealing parameters.

FIG. 7 illustrates schematically the monitoring apparatus used to provide feedback for controlling a machine parameter during a packaging operation. The parameter being controlled is the temperature to which the film is heated by the ribbons 26 and 28 on the sealing jaw 16. The temperature sensor 50 provides a signal indicative of the film temperature and that signal is transmitted by means of an optic coupler 180 to the inputs of the phased power controller 132 such as described above in connection with FIG. 6. The phased power controller 132 is effectively a variable heater control which energizes the heating ribbons 26 and 28 in accordance with the temperature-set component 182 illustrated as a variable resistor. In the absence of the feedback control, the variable resistor of the temperature-set component 182 establishes the phase of each AC cycle from the power supply 130 which is transmitted to the heating ribbons and, accordingly, the amount of power delivered to the ribbons can be set to produce a preselected temperature once the packaging machine 10 has operated through a number of cycles and effectively eliminated all transients that accompany a start-up of the machine. Of course, the temperature-set component 182 might initially be set to produce a higher temperature at the sealing of ribbons during the start-up phase of the operation and then be adjusted downwardly once the clamping jaws and associated equipment reach operating temperatures so that the pouch material experiences substantially the same degree of heating during both start-up and later stages of operation but, with the feedback system provided by the temperature sensor 50 and coupler 180, such adjustment of the component 182 may be eliminated entirely.

The optic coupler 180 includes the light emitting photodiode 184 and a phototransistor 186 coupled in parallel with the variable resistor of the temperature-adjust component 182. Light is emitted by the photodiode 184 to the phototransistor 186 and if the transistor is turned on, the impedance of the transistor varies as a function of the photons received from the diode 184. The combined operation of the sensor 50, amplifier 62 and the optic coupler 180 is such that when the temperature increases, the output voltage of the amplifier reduces and produces less current through the diode 184. The lower current results in less light being coupled to the phototransistor which in turn causes the transistor to exhibit a higher impedance in parallel with the temperature-adjust component 182. The above operation assumes that an enabling voltage is applied to the base of the phototransistor to place it in its conductive mode. Increasing the impedance of the transistor 186 increases the total impedance regulating the power controller 132 and reduces the energy or power applied to the sealing ribbons 26 and 28. The power applied to the "long seal" heater 14 and the cut-off wire 32 may also be adjusted at the same time. The temperature detected by the sensor 50 should therefore approach a stabilized temperature determined by the setting of the component 182. Effectively, the temperature detected by the sensor 50 is fed back by the optic coupler 180 and regulates the controller in conjunction with the temperature-adjustment of component 182 to achieve a desired temperature at the side of the seal opposite ribbons 26 and 28.

The feedback control illustrated in FIG. 7 can be used to provide continuous temperature feedback during operation of the packaging machine or may be used instead simply to compensate for the lower temperatures of the sealing jaws 16 and 18 during start-up phases of machine operation. If the feedback system is only utilized during start-up operations, it is disabled when temperature transients have leveled off, for example, after a predetermined number of the initial sealing operations. To this end, a decade counter 190 is connected with a clamp switch 192 which produces a pulse each time the jaws 16 and 18 open following a sealing operation. The clamp switch 192 is connected to the count input of the counter 190 and pulses the counter to cause the selected count outputs shown at the right of the counter in FIG. 7 to change sequentially as the number of sealing operations increases. One of the selected outputs representing a predetermined count or number of sealing operations is connected to the base of the phototransistor 186 and provides a disabling signal to shut the transistor off and thereby greatly increase the resistance of the transistor. With the transistor cut off, the collector-emitter resistance becomes extremely large relative to the variable resistor of component 182 and, effectively, the component 182 regulates the controller 132 by itself.

At the same time, the disabling signal from the counter 190 is also fed to the disabling input of the counter so that the predetermined count is held in spite of continued pulses received by the counter from the clamp switch 192. Operation of the counter 190 is not resumed until the packaging machine is started up again and the counter receives a pulse at the reset input from the start switch 194 for the packaging machine. Resetting the counter removes it from its disabled condition and again permits the clamp switch to run the counter up to the predetermined count which should represent the number of cycles that the packaging machine must execute before the transient conditions have leveled off. It will be readily appreciated, therefore, that the feedback system illustrated in FIG. 7 may be used either as a continuous feedback system or as a start-up compensator.

While the present invention has been described in a preferred embodiment it should be understood that numerous modifications and substitutions can be had without departing from the spirit of the invention. For example, although specific electrical circuits have been disclosed for generating the timing pulses which synchronize the operation of the comparators 64 and 66 with the packaging machine operation, other timing circuits can be used. The sampling and hold circuit disclosed in FIG. 6 may also be varied without departing from the more general concept of measuring the average energy imparted to the heating ribbons during each sealing operation. As mentioned above, the monitoring apparatus can employ one or more sensors alone or in combination to insure that high quality seals are formed in the discharged pouches during the machine operation. Accordingly, the present invention has been described in several embodiments by way of illustration rather than limitation.

I claim:

1. In a form, fill and seal packaging machine which discharges sealed film pouches filled with bulk material, seal monitoring apparatus comprising:
    a pair of reciprocating sealing jaws periodically moved into clamping relationship on the pouch film, one of the jaws bearing a heating element to fuse the clamped film and form a seal;
    a temperature sensor mounted on the other jaw opposite the heating element and at a station on the jaw contacted by the clamped film to detect the film temperature on the side of the clamped film opposite the heating element;
    a memory for storing a preselected seal temperature limit; and
    a comparator connected to the temperature sensor and the memory for comparing the sensed temperature and the preselected temperature limit and producing a signal when the limit is exceeded.

2. The seal monitoring apparatus of claim 1 further including:
    reject means connected to the comparator and responsive to the signal from the comparator to reject the discharged pouches.

3. The seal monitoring apparatus of claim 1 further including:
    an alarm connected to the comparator and responsive to the signal from the comparator to generate and alarm signal.

4. In a packaging machine which forms a heat seal in multiple piles of a fusible material by means of a pair of heat-sealing members which close in mating relationship on the material, the first of the sealing members having a heating element positioned to heat the material at one side of the plies and the second of the sealing members having a clamping surface disposed during a sealing operation at the other side of the plies directly opposite the heating element of the first sealing member, the seal monitoring apparatus comprising:
    sensing means connected with and cooperative with the sealing members to generate a signal representative of the temperature of the fusible material during operation of the sealing members in the packaging machine, the sensing means including a temperature sensor mounted on the second sealing member opposite the heating element of said first sealing member and at a station on said second sealing member which is contacted by said fusible material whereby the sensor detects the temperature to which the fusible material is elevated on said other side of clamped plies.

5. The seal monitoring apparatus of claim 4 further including comparator means connected to the temperature sensor for receiving the temperature signal generated by the sensor and for comparing the generated signal with a preselected reference.

6. The seal monitoring apparatus as defined in claim 4 in a packaging machine which first forms a first heat seal in the multiple plies with a first pair of sealing members and then forms a second heat seal in the plies intersecting said first heat seal with a second pair of sealing members in successive sealing operations wherein:
    the sensing means comprises a temperature sensor mounted on a sealing member of the second pair at a station on the sealing member adjacent the intersection of the two seals formed.

7. The seal monitoring apparatus of claim 4 wherein:
the sensing means further includes a pressure sensor associated with one of the sealing members for detecting the pressure with which the sealing members close on the fusible material during a sealing operation.

8. The seal monitoring apparatus as defined in claim 4 wherein:
the temperature sensor comprises a thermocouple.

9. The seal monitoring apparatus as defined in claim 4 further including:
timing signal generating means connected to and synchronized with the packaging machine for signaling an interval in the machine operation during which the seal temperature may be monitored.

10. The seal monitoring apparatus as in claim 9 wherein the timing signal generating means comprises an electrical strobing circuit having a mechanically operated switch connected to the machine for actuation, a pulse circuit including a charging resistor and a capacitor connected at their junction to a pulse shaper, the pulse circuit being energized by means of the mechanically operated switch.

11. The seal monitoring apparatus of claim 10 wherein the pulse circuit further includes a silicon controlled rectifier connected through the mechanical switch to the capacitor, and a resistor-capacitor delay network controlling the rectifier for triggering the pulse circuit a predetermined interval after the mechanical switch is closed.

12. In a packaging machine which forms sealed packages by producing a heat seal in a material between a pair of cyclically operated, heated sealing jaws energized through a variable heater control, monitoring apparatus comprising:
temperature setting means connected with the variable heater control to establish a desired seal temperature;
a temperature sensor detecting the temperature to which the material is elevated by the jaws;
feedback means connected to the temperature sensor and the variable heater control for varying the energization of the heating jaws in accordance with the temperature established by the setting means and the temperature detected by the sensor and
means for limiting the operation of the feedback means to the initial sealing operations following start-up of the packaging machine.

13. The monitoring apparatus of claim 12 in a packaging machine utilizing a phased power controller wherein:
the temperature-setting means comprises a variable impedance determining the operative portion of the power phases energizing the sealing jaws; and
the feedback means comprises a coupler having an impedance element connected in parallel with the variable impedance of the temperature setting means and is itself variable in accordance with the temperature detected by the sensor whereby the operative portion of the power phases energizing the heated sealing jaws is varied in accordance with the temperature fed back to the controller through the coupler from the sensor.

14. The monitoring apparatus of claim 13 wherein the coupler is an optic coupler having a light-emitting diode connected with and controlled by the temperature sensor and a phototransistor responsive to the diode and serving as the variable impedance element of the coupler.

15. The monitoring apparatus of claim 12 wherein the means for limiting includes:
means for detecting the number of cyclic sealing operations performed by the jaws; and
means connected with the means for detecting and connected to the feedback means for disabling the feedback means after a predetermined number of sealing operations.

* * * * *